United States Patent [19]

Etchu et al.

[11] Patent Number: 5,731,071
[45] Date of Patent: Mar. 24, 1998

[54] BIAXIALLY ORIENTED POLYESTER FILM

[75] Inventors: Masami Etchu, Yokohama; Masahiro Hosoi, Tokyo; Masanori Nishiyama, Sagamihara; Yasuhiro Saeki, Sagamihara; Hisashi Hamano, Sagamihara, all of Japan

[73] Assignee: Teijin Limited, Osaka, Japan

[21] Appl. No.: 503,032

[22] Filed: Jul. 17, 1995

Related U.S. Application Data

[63] Continuation of Ser. No. 162,195, Dec. 16, 1993, abandoned.

[30] Foreign Application Priority Data

Apr. 16, 1992 [JP] Japan ................................. 4-096655
Jun. 15, 1992 [JP] Japan ................................. 4-155015

[51] Int. Cl.$^6$ ................ B32B 27/00; B32B 27/06; B32B 27/36; C08G 63/189
[52] U.S. Cl. ................ 428/220; 428/480; 428/910; 528/302; 528/305; 528/308; 174/110 SR; 174/137 R
[58] Field of Search ................ 428/480, 910, 428/694 ST, 694 SL, 220, 332, 337, 338, 339; 528/302, 305, 308; 174/137 R, 110 PM, 110 SR

[56] References Cited

U.S. PATENT DOCUMENTS

| | | | |
|---|---|---|---|
| 3,937,754 | 2/1976 | Shimotsuma et al. | 260/860 |
| 3,984,379 | 10/1976 | Oka et al. | 260/75 M |
| 4,729,915 | 3/1988 | Sakamoto et al. | 428/141 |
| 4,814,221 | 3/1989 | Utsumi | 428/220 |

FOREIGN PATENT DOCUMENTS

| | | |
|---|---|---|
| 0228601 | 7/1987 | European Pat. Off. |
| 2193853 | 2/1974 | France |
| 2224505 | 10/1974 | France |
| 62-115609 | 5/1987 | Japan |
| 62-136013 | 6/1987 | Japan |
| 260728 | 3/1990 | Japan |
| 9003993 | 4/1990 | WIPO |

OTHER PUBLICATIONS

Database WPI Week 8847, Derwent Publications Ltd., London, GB; AN 88–336072 Anonymous & Research Disclosure vol. 294, No. 028, 10 Oct. 1988.

Database WPI Week 7541, Derwent Publications Ltd., London, GB; AN 75–67874W & JP–A–50 024 336 (Teijin) 15 Mar. 1975.

*Primary Examiner*—Paul J. Thibodeau
*Assistant Examiner*—Vivian Chen
*Attorney, Agent, or Firm*—Sherman and Shalloway

[57] ABSTRACT

A biaxially oriented polyester film which has excellent resistances to dry heat deterioration and wet heat deterioration, which can withstand the use in an atmosphere of relatively high moisture content, and which is useful, for example, as an electrical insulating film, a film for transparent electrode, a film for absorption of electromagnetic wave (e.g. a film used as an inspection window of microwave oven) and a reflection film. This polyester contains [ethylene-2,6-naphthalenedicarboxylate as the main recurring unit.] 99.5 to 95 mole % of ethylene-2,6-naphthalenedicarboxylate and 0.5 to 5 mole % of ethylene-2,7-naphthalenedicarboxylate and has a density of 1.355 to 1.370 g/cm$^3$ and an intrinsic viscosity of 0.62 to 0.90. The polyester film has an amount of terminal carboxyl in the polyester of 40 eg/10$^6$g or less and an amount of oligomers of 2.0 mg/m$^2$ film or less.

10 Claims, No Drawings

BIAXIALLY ORIENTED POLYESTER FILM

This is a continuation of application Ser. No. 08/162,195, filed Dec. 16, 1993, now abandoned.

TECHNICAL FIELD

The present invention relates to a biaxially oriented polyester film and its use for electrical insulation. More particularly, the present invention relates to a biaxially oriented polyester film having excellent resistances to dry heat deterioration and wet heat deterioration, and to its use for electrical insulation.

BACKGROUND ART

Having a high strength, a high elastic modulus and a high heat resistance, a biaxially oriented polyethylene-2,6-naphthalenedicarboxylate film is used in various applications such as base film for magnetic recording medium, thin dielectric film for capacitor, diaphragm for extremely small-sized speaker, electrical insulating material and the like.

In general, a polyester film typified by a biaxially oriented polyethylene terephthalate film and a biaxially oriented polyethylene-2,6-naphthalenedicarboxylate film, has hydrolyzability. For example, when placed in a condition in which water vapor is present, the film loses flexibility with the lapse of time since scission of the molecular chain in the polyester is liable to take place and, when exposed to water vapor for a long period of time, it undergoes deterioration to become powdery. Even when the film is placed in milder conditions, i.e. in an atmosphere in which a very small amount of moisture is present at relatively high temperatures, the above deterioration reaction takes place, resulting in deterioration of the film after a long period of time.

When a polyester film is used, for example, for electrical insulation, it is believed that the scission of molecular chain caused by hydrolysis takes place at relatively low temperatures (180° C. or below), while the reforming of higher structure, e.g. orientation and crystallinity, predominantly takes place at high temperatures (170° C. or above). And, in the polyester films for continuous use at temperatures up to about 160° C., the important problem to be settled is not the reforming of microstructure at high temperatures but rather the deterioration of mechanical properties and electrical insulating property caused by the scission of molecular chain brought about by hydrolysis.

The biaxially oriented polyester films used for electrical insulation is required to have characteristics that they generally satisfy the following requirements: (1) even when exposed to high temperatures over a long period of time, they neither deteriorate in mechanical properties to get fragile, nor deteriorate in insulation performance to have lower dielectric breakdown property, (2) they give rise to no delamination (interlaminar peeling) during use, and (3) the amount of low-molecular-weight substances (oligomers) at the film surface or inside the film is small.

In order to achieve improved resistance to heat deterioration or to decrease a lower oligomer content, an approach of increase in stretch ratio to improve molecular orientation is effective, and this approach is in actual use. This approach, however, produces a new problem that the improvement in plane orientation tends to invite delamination of film, thus imposing a restriction on an increase in stretch ratio.

In order to prevent the occurrence of delamination, there is an approach of decrease in plane orientation, which is contrary to the above. This approach, contrary to the above, invites a decrease in heat deterioration resistance and increase in amount of oligomers generated.

Thus, there are various problems to be solved in the production of a film for electrical insulation which simultaneously satisfies the principle properties required in said application.

An object of the present invention is to provide a biaxially oriented polyester film.

Another object of the present invention is to provide a biaxially oriented polyester film having excellent resistances to dry heat deterioration and wet heat deterioration.

Still another object of the present invention is to provide a biaxially oriented polyester film which does not cause delamination and which scarcely contains an oligomer.

Still another object of the present invention is to provide a film for electrical insulation for which the above biaxially oriented polyester film of the present invention is used.

Other objects and advantages of the present invention will become apparent from the following description.

The above objects and advantages of the present invention can be achieved first by a biaxially oriented polyester film which (A) substantially comprises a polyester containing ethylene-2,6-naphthalenedicarboxylate as the main recurring unit, and (B) has (a) a resistance to dry heat deterioration (a time in which 50% of the breaking strength is retained) at 200° C. of at least 2,000 hours, (b) a resistance to wet heat deterioration (a time in which 50% of the breaking elongation is retained) at 130° C. of at least 100 hours, (c) a density of 1.355 to 1.370 g/cm$^3$, and (d) an intrinsic viscosity, as measured at 35° C. in o-chlorophenol, of 0.60 to 0.90.

The polyester constituting the biaxially oriented polyester film of the present invention comprises ethylene-2,6-naphthalenedicarboxylate as the main recurring unit.

Such polyester contains 2,6-naphthalenedicarboxylic acid as the main dicarboxylic acid component and contains ethylene glycol as the main glycol component.

As other dicarboxylic acids which the above polyester can contain, there can be given, for example, aromatic dicarboxylic acids such as 2,7-naphthalenedicarboxylic acid, 1,5-naphthalenedicarboxylic acid, phthalic acid, terephthalic acid, isophthalic acid, diphenylsulfonedicarboxylic acid, benzophenonedicarboxylic acid and the like; aliphatic dicarboxylic acids such as succinic acid, adipic acid, sebacic acid, dodecanedicarboxylic acid and the like; and alicyclic dicarboxylic acids such as hexahydroterephthalic acid, 1,3-adamantanedicarboxylic acid and the like.

As other glycols which the polyester can contain, there can be mentioned, for example, 1,3-propanediol, 1,4-butanediol, 1,6-hexanediol, 1,4-cyclohexanedimethanol and p-xylylene glycol.

The other dicarboxylic acids are preferably 0.5 to 5 mole %, more preferably 0.5 to 3 mole %, based on the total dicarboxylic acid components. Also, the other glycols are preferably 0.5 to 5 mole %, more preferably 0.5 to 3 mole %, based on the total glycol components.

When the amount of the copolymer component is less than 0.5 mole %, it is difficult to obtain a polyester with improved resistance to dry heat deterioration. When the amount of the copolymer component is more than 5 mole %, the amount of the oligomers generated tends to be large and it is difficult to obtain a biaxially oriented film with improved resistance to heat deterioration.

The polyester particularly preferably used in the present invention is a polyester composed of 99.5 to 95 mole % of ethylene-2,6-naphthalenedicarboxylate and 0.5 to 5 mole % of ethylene-2,7-naphthalenedicarboxylate.

The polyester used in the present invention can contain additives, for example, a stabilizer, a coloring agent, an antistatic agent and the like. In particular, it is preferable to add to the polyester a variety of inert solid fine particles in order to make the film surface rough for achieving improved sliding property. Preferable examples of the inert solid fine particles are (1) silicon dioxide (including hydrates, silica sand, quartz, etc.); (2) alumina; (3) silicates each containing 30% by weight or more of an $SiO_2$ component, for example, an amorphous or crystalline clay mineral, aluminosilicate (including a calcined material and hydrate), chrysotile and fly ash; (4) oxides of Mg, Zn, Zr and Ti; (5) sulfates of Ca and Ba; (6) phosphates of Li, Na and Ca (including monohydrogen salts and dihydrogen salts); (7) benzoates of Li, Na and K; (8) terephthalates of Ca, Ba, Zn and Mn; (9) titanares of Mg, Ca, Ba, Zn, Cd, Pb, St, Mn, Fe, Co and Ni; (10) chromates of Ba and Pb; (11) carbon (for example, carbon black and graphite); (12) glass (for example, glass powder and glass beads); (13) carbonates of Ca and Mg; (14) fluorite; and (15) ZnS. More preferable examples are silicon dioxide, silicic acid anhydride, hydrous silicic acid, aluminum oxide, aluminum silicate (including a calcined material, a hydrate, etc.), monolithium phosphate, trilithium phosphate, calcium phosphate, barium sulfate, titanium oxide, lithium benzoate, double salts of these compounds (including hydrates), glass powder, clay (including kaolin, bentonite, terra abla, etc.), talc and calcium carbonate. Particularly preferable examples are silicon dioxide, titanium oxide and calcium carbonate. The inert solid fine particles preferably have an average particle diameter of 0.3 to 3 μm and are preferably used in an amount of 0.01 to 1% by weight.

The polyester used in the present invention has terminal carboxyl in an amount of preferably 40 eq/$10^6$ g or less, more preferably 35 eq/$10^6$ g or less.

The polyester has an intrinsic viscosity in the range of 0.60 to 0.90, preferably 0.62 to 0.85, more preferably 0.64 to 0.65, as measured at 35° C. in o-chlorophenol.

Further, in the polyester used in the present invention, it is preferred that the content of oligomers is small and, when made into a film, it is, for example, 2.0 mg/$m^2$ film or less.

The polyester used in the present invention can be produced generally by a known process according to the melt polymerization method. It can be produced, for example, by mixing 2,8-naphthalenedicarboxylic acid, 2,7-naphthalenedicarboxylic acid and ethylene glycol in given amounts, subjecting the mixture to direct electrification at normal pressure or at an applied pressure, and further conducting melt polycondensation under reduced pressure. In this case, additives such as catalyst and the like can be used as required.

The biaxially oriented polyester film of the present invention can be produced, for example, by subjecting a sufficiently dried polyester to melt extrusion at a temperature ranging from the melting point to (the melting point +70)° C., rapidly cooling the extrudate on a casting drum to obtain an unstretched film, subjecting the unstretched film to consecutive or simultaneous biaxial stretching and then to thermosetting. The preferred biaxial stretching is a consecutive biaxial stretching, and it is preferable to stretch the unstretched film by 2.5 to 5.7 times in the longitudinal direction at 130° to 170° C., then stretch by 2.5 to 5.7 times in the transverse direction at 130° to 150° C. with a stenter, and thereafter thermoset at 190° to 250° C. under tension or restricted shrinkage. The time of thermosetting is preferably 10 to 30 seconds. Also preferably, the conditions of stretching in the longitudinal direction and the transverse direction are selected so that the biaxially oriented polyester film obtained has almost the same properties in the two directions. In the case of simultaneous biaxial stretching, the above stretching temperatures, stretch ratios, thermosetting temperature, etc. can be also applied.

The biaxially stretched film can be subjected, as required, to re-stretching in the longitudinal direction and/or the transverse direction; that is, a three-stage stretching method or a four-stage stretching method can be employed. The four-stage stretching method can be preferably conducted by stretching an unstretched film by 1.8 to 2.8 times in the longitudinal direction at 130° to 150° C., then stretching the resulting film by 3.5 to 5 times in the transverse direction using a stenter, followed by thermosetting (intermediate thermosetting) at 140° to 170° C. for 10 to 30 seconds. Subsequently, the resulting stretched film is re-stretched by 1.5 to 3.0 times in the longitudinal direction at 150° to 180° C., then re-stretched by 1.2 to 2.4 times in the transverse direction at 150° to 190° C. using a stenter, followed by thermosetting under tension at 190° to 250° C. for 10 to 30 seconds.

In order to obtain a film which causes no delamination, it is also possible to subject the above-thermoset film to a heat treatment at a higher temperature. When a biaxially oriented film of low heat shrinkage is desired, a known thermal relaxation treatment method or the like can be applied.

The biaxially oriented polyester film of the present invention has a resistance to dry heat deterioration (a time in which 50% of the breaking strength is retained) at 200° C. of at least 2,000 hours, preferably at least 2,100 hours.

When the life of resistance to dry heat deterioration is less than 2,000 hours, reforming of microstructure tends to occur at relatively high temperatures, and such film is unsuitable, for example, for electrical insulation.

The biaxially oriented polyester film of the present invention has a resistance to wet heat deterioration (a time in which 50% of the breaking elongation is retained) at 130° C. of at least 100 hours, preferably at least 110 hours. When the life of resistance to wet heat deterioration is less than 100 hours, undesirably, such film is significantly deteriorated in mechanical properties and electrical insulating property when placed in an environment in which water vapor is present.

The biaxially oriented polyester film of the present invention has a density in the range of 1.355 to 1.370 g/$cm^3$, preferably 1.356 to 1.365 g/$cm^3$.

The biaxially oriented polyester film of the present invention can have a thickness in the range of, for example, 12 to 400 μm. It has a thickness in the range of preferably 40 to 350 μm, more preferably 40 to 250 μm.

As described above, the biaxially oriented polyester film of the present invention has excellent resistance to dry heat deterioration and excellent resistance to delamination and contains a small amount of oligomers, and is therefore used particularly preferably as an electrical insulating film.

Hence, according to the present invention there is also provided an insulating film comprising the biaxially oriented polyester film of the present invention, and use of the present biaxially oriented polyester film for electrical insulation.

The biaxially oriented polyester film of the present invention is useful, for example, as an insulating material for motor, a dielectric material for capacitor, a substrate for flexible print circuit and a film for membrane switch. The present biaxially oriented polyester film, capable of withstanding the use in an atmosphere of relatively high moisture content, is also useful, besides as an electrical insulating film, for example, as a film for transparent electrode, a film for absorption of electromagnetic wave (e.g. a film used as an inspection window of microwave oven) and a reflection film.

The present invention is further described below by way of Examples. In the present invention, various properties were measured and are defined as follows.

(1) Resistance to wet heat deterioration

Water is placed at the bottom of an autoclave having a capacity of 3 liters. A film sample is suspended in the autoclave under no load applied to the film sample, in such a way that the film sample is not immersed in water. The autoclave inside is heated to 130° C., kept at that temperature for a given length of time, and cooled to room temperature, after which the film sample is taken out. The thus obtained sample is measured for breaking elongation and there is determined, by extrapolation, a time in which the breaking elongation is reduced to 50% of the initial value. The time is taken as the resistance to wet heat deterioration, of the film sample used.

Breaking elongation is determined by the following method.

A film sample cut into a rectangular shape having a size of 10 mm (width) and 180 mm (length) is pulled using an Instron type tensile tester under the conditions of distance between chucks =100 mm and tensile speed =10 mm/min. Using the original length ($L_o$) and the length at breakage (L), the breaking elongation of the sample is determined from the following equation.

$$[(L-L_o)/L_o] \times 100 \ (\%)$$

(2) Resistance to dry heat deterioration

A film sample cut into a rectangular shape having a size of 10 mm (width) and about 200 mm (length) is kept in an air oven maintained at 200° C., for a given length of time to allow the film sample to undergo heat deterioration, and then the film sample is taken out. The thus obtained film sample is measured for mechanical property (breaking strength and breaking elongation) and there is determined, by extrapolation, a time in which the breaking strength is reduced to 50% of the initial value. The time is taken as the resistance to dry heat deterioration, of the film sample used.

(3) Amount of oligomers extracted

A film (38 mm×38 mm) was dipped in 20 cc of chloroform at 25° C. for 1 hour and then taken out. The amount of oligomers in the resulting chloroform was determined from the absorbance at a measurement wavelength of 240 nm. The correlation between oligomer concentration and absorbance was prepared beforehand in the form of a calibration curve.

In the measurement of absorbance, there was used UV-3101PC (UV-VIS-NIR Automatic Recording Spectrophotometer manufactured by Shimadzu Corp).

(4) Delamination 100 throughholes were made in a film with a needle of a sewing machine for bag, manufactured by The New Long Manufacturing Co., at room temperature. When the film caused no delamination, the throughholes were fine and had diameters nearly equal to the size of the needle. However, when the film caused delamination, the portions surrounding the throughholes cracked in layers in the film thickness direction, which made larger the damaged portions. The area of the damaged portions including the throughholes was measured to use it as the criterion for the delaminating degree of the film used.

When the area was "equal to" to "less than 1.5 times" the area of the throughholes, the delamination of the film used was rated as grade 1; when the area was "1.5 times" to "less than 2.0 times", the delamination was rated as grade 2; and when the area was "2.0 times or more", the delamination was rated as grade 3.

(5) Intrinsic viscosity 0.3 g of a sample was dissolved under heating in 25 ml of o-chlorophenol at 150° C. for 30 minutes. The resulting solution was measured for solution viscosity at 35° C. to obtain the intrinsic viscosity of the sample used.

(6) Amount of terminal carboxyl 180 mg of a sample was dissolved under heating in a p-xylene/m-cresol mixed solvent (volume ratio: 2/3) in a nitrogen atmosphere. The solution was neutralized through titration with $CH_3ONa$ (0.02 mole/l in a $CH_3OH$ solution) using Bromophenol Blue as an indicator. When the amount of the $CH_3ONa$ solution required for neutralization is X (ml) and the amount of the $CH_3ONa$ solution required for neutralization of the same mixed solution containing no sample but subjected to the same treatment is B (ml), the amount of terminal carboxyl (COOH) in the sample used can be calculated using the following equation.

$$[(X-B)(0.02 \times f)/(10^3 \times 0.18)] \times 10^6 = (COOH) \qquad (eq/t)$$

(f: factor of $CH_3ONa$ 0.02 mole/l)

EXAMPLES

Example 1

A modified polyethylene-2,6-naphthalenedicarboxylate in which a 2,7-naphthalenedicarboxylic acid component was copolymerized at a proportion of 0.5 15 mole % and which contained, as a lubricant, 0.02% by weight of calcium carbonate fine particles having an average particle diameter of 0.6 μm and 0.3% by weight of silica fine particles having an average particle diameter of 0.1 μm, was dried at 170° C., then subjected to melt extrusion at 295° C., and rapidly cooled on a casting drum maintained at 60° C. to solidify, whereby an unstretched film was obtained.

The unstretched film was heated through heating rolls, and then heated to 130° C. using an infrared heater to stretch the film by 4 times in the longitudinal direction. The resulting film was further stretched by 4.3 times in the transverse direction at 148° C. using a tenter, followed by a heat treatment at 220° C. for 30 seconds, whereby a biaxially oriented polyester film having a thickness of 50 μm was produced.

The properties of the biaxially oriented polyester film are shown in Table 1.

Examples 2 to 5

The modified polyethylene-2,6-naphthalenedicarboxylates having the compositions shown in Table 1 (each containing fine particles of the same kinds and amounts as in Example 1) were subjected to the same procedure as in Example 1 to obtain unstretched films. The unstretched films were stretched and heat-treated under the conditions shown in Table 1 to obtain biaxially oriented polyester films. The properties of the biaxially oriented polyester films are shown in Table 1.

TABLE 1

| | Example 1 | Example 2 | Example 3 | Example 4 | Example 5 |
|---|---|---|---|---|---|
| Proportion of 2,7-naphthalenedicarboxylic acid copolymerized (mole %) | 0.50 | 2.0 | 0.5 | 5.0 | 0.5 |
| Amount of terminal carboxyl (eq/$10^6$ g) | 25 | 30 | 25 | 35 | 25 |
| Stretching conditions 1st stage: longitudinal stretch ratio | 4.0 | 4.85 | 2.0 | 3.5 | 4.85 |
| 2nd stage: transverse stretch ratio | 4.3 | 5.20 | 4.0 | 3.6 | 5.20 |
| Intermediate thermosetting temp. (°C.) | — | — | 160 | — | — |
| 3rd stage: longitudinal stretch ratio | — | — | 3.0 | — | — |
| 4th stage: transverse stretch ratio | — | — | 1.7 | — | — |
| Thermosetting temperature (°C.) | 220 | 220 | 230 | 230 | 225 |
| Film properties Film intrinsic viscosity | 0.70 | 0.70 | 0.70 | 0.70 | 0.85 |
| Film density (g/$cm^3$) | 1.358 | 1.357 | 1.358 | 1.358 | 1.358 |
| Amount of oligomers extracted (mg/$m^2$) | 1.7 | 1.7 | 1.4 | 1.7 | 1.5 |
| Delamination (grade) | 2 | 1 | 1 | 1 | 1 |
| Resistance to dry heat deterioration (hr) | 2200 | 2500 | 2200 | 2400 | 2200 |
| Resistance to wet heat deterioration (hr) | 110 | 120 | 130 | 130 | 130 |

Comparative Examples 1 to 6

The polyesters having the compositions shown in Table 2 (each containing fine particles of the same kinds and amounts as in Example 1) were subjected to the same procedure as in Example 1 to obtain unstretched films. The unstretched films were stretched and heat-treated under the conditions shown in Table 2 to obtain biaxially oriented polyester films. The properties of the biaxially oriented polyester films are shown in Table 2.

TABLE 2

| | Comparative Example 1 | 2 | 3 | 4 | 5 | 6 |
|---|---|---|---|---|---|---|
| Proportion of 2,7-naphthalenedicarboxylic acid copolymerized (mole %) | 0 | 0 | 0.1 | 7.0 | 0.5 | 0 |
| Amount of terminal carboxyl (eq/$10^6$ g) | 20 | 20 | 25 | 45 | 25 | 20 |
| Stretching conditions 1st stage: longitudinal stretch ratio | 3.5 | 4.0 | 3.5 | 3.5 | 3.5 | 4.0 |
| 2nd stage: transverse stretch ratio | 3.6 | 4.3 | 3.6 | 3.6 | 3.6 | 4.3 |
| Intermediate thermosetting temp. (°C.) | — | — | — | — | — | — |
| 3rd stage: longitudinal stretch ratio | — | — | — | — | — | — |
| 4th stage: transverse stretch ratio | — | — | — | — | — | — |
| Thermosetting temperature (°C.) | 230 | 220 | 230 | 230 | 230 | 220 |
| Film properties Film intrinsic viscosity | 0.60 | 0.45 | 0.60 | 0.7 | 0.6 | 0.70 |
| Film density (g/$cm^3$) | 1.358 | 1.350 | 1.356 | 1.358 | 1.356 | 1.358 |
| Amount of oligomers extracted (mg/$m^2$) | 1.7 | 2.2 | 1.7 | 2.0 | 1.7 | 1.5 |
| Delamination (grade) | 3 | 3 | 3 | 1 | 3 | 3 |
| Resistance to dry heat deterioration (hr) | 2000 | 1500 | 2000 | 1800 | 2000 | 2200 |
| Resistance to wet heat deterioration (hr) | 80 | 70 | 80 | 80 | 80 | 110 |

What is claimed is:

1. A biaxially oriented polyester film which
   (A) comprises 99.5 to 95 mole % of ethylene-2,6-naphthalenedicarboxylate and 0.5 to 5 mole % of ethylene-2,7-naphthalenedicarboxylate, and
   (B) has (a) a resistance to dry heat deterioration at 200° C. for a time in which 50% of the breaking strength is retained of at least 2100 hours,
      (b) a resistance to wet heat deterioration at 130° C. for a time in which 50% of the breaking elongation is retained of at least 100 hours,
      (c) a density of 1.355 to 1,370 g/$cm^3$,
      (d) an intrinsic viscosity, as measured at 35° C. in o-chlorophenol, of 0.62 to 0.90,
      (e) a delamination grade of 1 or 2, and
   wherein the amount of terminal carboxyl in the polyester is 40 eq/$10^6$ g or less and the amount of oligomers in the polyester is 2.0 mg/$m^2$ film or less.

2. The biaxially oriented polyester film set forth in claim 1, wherein the intrinsic viscosity of the polyester is 0.62 to 0.85.

3. The biaxially oriented polyester film set forth in claim 1, which has a film thickness of 12 to 400 μm.

4. An electrical insulating film comprising the biaxially oriented polyester film set forth in claim 1.

5. An electrical insulation film which
   (A) comprises 99.5 to 95 mole % of ethylene-2,6-naphthalenedicarboxylate and 0.5 to 5 mole % of ethylene-2,7-naphthalenedicarboxylate, and
   (B) has (a) a resistance to dry heat deterioration at 200° C. for a time in which 50% of the breaking strength is retained of at least 2,000 hours,
      (b) a resistance to wet heat deterioration at 130° C. for a time in which 50% of the breaking elongation is retained of at least 100 hours,
      (c) a density of 1,355 to 1,370 g/$cm^3$, (d) an intrinsic viscosity, as measured at 35° C. in o-chlorophenol, of 0.62 to 0.90, and wherein the amount of terminal carboxyl in the polyester is 40 eq/$10^6$ g or less and the amount of oligomers in the polyester is 2.0 mg/$m^2$ film or less.

6. The biaxially oriented polyester insulation film set forth in claim 5, wherein the intrinsic viscosity of the polyester is 0.62 to 0.85.

7. The biaxially oriented polyester insulation film set forth in claim 5, which has a film thickness of 12 to 400 μm.

8. A biaxially oriented copolymer polyester film wherein said copolymer (A) consists essentially of 99.5 to 95 mole % of ethylene-2,6-naphthalenedicarboxylate and 0.5 to 5 mole % of ethylene-2,7-naphthalenedicarboxylate, and (B) has (a) a resistance to dry heat deterioration at 200° C. for a time in which 50% of the breaking strength is retained of at least 2,000 hours, (b) a resistance to wet heat deterioration at 130° C. for a time in which 50% of the breaking elongation is retained of at least 100 hours, (c) a density of 1.355 to 1.370 g/$cm^3$, (d) an intrinsic viscosity, as measured at 35° C. in o-chlorophenol, of 0.70 to 0.85, (e) a delamination grade of 1 or 2 and wherein the amount of terminal carboxyl in the polyester is 40 eg/$10^6$g or less and the amount of oligomers in the polyester is 2.0 mg/$m^2$ or less.

9. A biaxially oriented copolymer electrical insulation film wherein said copolymer (a) consists essentially of 99.5 to 95 mole % of ethylene-2,6-naphthalenedicarboxylate and 0.5 to 5 mole % of ethylene-2,7-naphthalenedicarboxylate, and (B) has (a) a resistance to dry heat deterioration at 200° C. for a time in which 50% of the breaking strength is retained of at least 2,100 hours, (b) a resistance to wet heat deterioration at 130° C. for a time in which 50% of the breaking elongation is retained of at least 100 hours, (c) a density of 1.355 to 1.370 g/$cm^3$, (d) an intrinsic viscosity, as measured at 35° C. in o-chlorophenol, of 0.62 to 0.90, (e) a delamination grade 1 or 2, (f) having a thickness of 40 to 250 μm and wherein the amount of terminal carboxyl in the copolymer is 40 eq/$10^6$ g or less and the amount of oligomers in the copolyester is 2.0 mg/$m^2$ film or less.

10. A method of insulating a material requiring insulation protection which comprises applying the insulation film of claim 9 to said material.

* * * * *